United States Patent
Choi et al.

(10) Patent No.: US 8,471,877 B2
(45) Date of Patent: Jun. 25, 2013

(54) IMAGE FORMING APPARATUS FOR AND METHOD OF CORRECTING COLOR REGISTRATION ERROR

(75) Inventors: Jong-Chul Choi, Suwon-Si (KR); Young-Jin Park, Bucheon-Si (KR); Jin-Ho Lee, Suwon-Si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 591 days.

(21) Appl. No.: 12/634,239

(22) Filed: Dec. 9, 2009

(65) Prior Publication Data

US 2010/0142980 A1 Jun. 10, 2010

(30) Foreign Application Priority Data

Dec. 10, 2008 (KR) .................. 10-2008-0125340

(51) Int. Cl.
*G03G 15/01* (2006.01)
*B41J 2/47* (2006.01)

(52) U.S. Cl.
USPC ................ 347/116; 347/234; 347/260

(58) Field of Classification Search
USPC .................... 347/116, 234, 260
See application file for complete search history.

(56) References Cited

U.S. PATENT DOCUMENTS

| | | | | |
|---|---|---|---|---|
| 4,787,748 | A * | 11/1988 | Rioux | 356/608 |
| 6,281,922 | B1 * | 8/2001 | Suzuki | 347/235 |
| 6,757,008 | B1 * | 6/2004 | Smith | 348/143 |
| 7,253,935 | B2 * | 8/2007 | Kobayashi et al. | 359/196.1 |

* cited by examiner

*Primary Examiner* — Omar Rojas
(74) *Attorney, Agent, or Firm* — Staas & Halsey LLP (57) ABSTRACT

Disclosed is an image forming apparatus capable of, and a method of, correcting a color registration error. The image forming apparatus corrects a color registration error by adjusting a scan start time of, and/or the distance in a sub-scanning direction between, multiple light beams that are scanned by a light scanning unit onto several photosensitive media.

13 Claims, 10 Drawing Sheets

IMAGE FORMING APPARATUS FOR AND METHOD OF CORRECTING COLOR REGISTRATION ERROR

CROSS-REFERENCE TO RELATED PATENT APPLICATION

This application claims the benefit of Korean Patent Application No. 10-2008-0125340, filed on Dec. 10, 2008, in the Korean Intellectual Property Office, the disclosure of which is incorporated herein by reference in its entirety.

TECHNICAL FIELD

The present disclosure generally relates to an image forming apparatus and method of correcting a color registration error.

BACKGROUND OF RELATED ART

Electro-photographic image forming apparatuses can form an electrostatic latent image by scanning light beams onto a photosensitive surface of a drum using a light scanning unit, can develop the electrostatic latent image using a developing agent, such as toner, to generate a toner image, can transfer the toner image onto a print medium, and can fix the toner image to the print medium.

A light scanning unit in a conventional image forming apparatus typically uses a polygon mirror driven by a spindle motor. There has been a recent demand, however, for a substitute for light scanning units using a polygon mirror that can overcome current limitations in the speed of the polygon mirror, that need not include a spindle motor so as to remove a source of noise generated during high speed operation, and that is small enough such that the size of the light scanning unit can be reduced.

A light scanning unit using a micro electro-mechanical system (MEMS) structure can be used to overcome limitations associated with light scanning units that use polygon mirrors. MEMS structures can allow for bidirectional scanning and high speed scanning, and can be made sufficiently small when fabricated by a semiconductor process. MEMS structures can be particularly useful in light scanning units that can scan multiple light beams, such as those used to form a color image. A MEMS double-sided mirror scanner can be advantageous in that a MEMS double-sided mirror scanner can scan multiple light beams concurrently by rotationally oscillating a double-sided mirror.

SUMMARY OF THE DISCLOSURE

According to an aspect of the present disclosure, there is provided an image forming apparatus for forming an image by overlapping a plurality of monochromatic images respectively received from a plurality of photosensitive media that may include a light scanning unit that may include a scanner configured to rotationally oscillate. The scanner may include at least one pair of oppositely facing mirrors each configured to deflect light. The light scanning unit may be configured to scan a plurality of light beams deflected by the at least one pair of oppositely facing mirrors across surfaces of the plurality of photosensitive media along a main scanning direction. One or more distances, along a sub-scanning direction substantially perpendicular to the main scanning direction, between light beam spots formed on the plurality of photosensitive devices by the plurality of light beams may be adjustable.

The light scanning unit may comprise one or more light source units each configured to produce a first light beam and a second light beam. The light scanning unit may be configured to selectively output one of the first light beam and the second light beam. The first light beam when output by the light scanning unit may form a first light beam spot at a first position on a first one of the plurality of photosensitive media. The second light beam may form a second light beam spot on the first one of the plurality of photosensitive media at a second position different from the first position.

The one or more light source units may each comprise a multi-beam emitting device having a plurality of light emitting points.

The light source unit may include a first light source associated with producing the first light beam, a second light source associated with producing the second light beam and an optical device disposed in optical paths of the first and second light beams. Each of the first light source and the second light source may produce a single light beam. The optical device may be configured to cause the first light beam and the second light beam to travel along optical paths offset from each other in the sub-scanning direction.

The light scanning unit may comprise a light source unit and an optical device. The light source unit may include a plurality of light sources each producing a respective associated one of the plurality of light beams. Each of the plurality of light beams may correspond to an associated respective one of the plurality of monochromatic images. The optical device may be disposed in an optical path between a first one of the plurality of light sources and a first one of the plurality of photosensitive media associated with the first one of the plurality of monochromatic images. The optical device may be configured to change the optical path along the sub-scanning direction.

The optical device may include a reflective device that may be configured to produce a change in an angle of reflection by which a first one of the plurality of light beams produced by the first one of the plurality of light sources is reflected by the reflective device.

The optical device may alternatively include a refractive device configured to produce a change in the sub-scanning direction of the optical path by changing a position of refraction of a first one of the plurality of light beams produced by the first one of the plurality of light sources as that first one of the plurality of light beams passes through the optical device.

The refractive device may include one or more of a collimating lens, a cylindrical lens and an arcsin-theta lens.

The light scanning unit may be configured to adjust the one or more distances along the sub-scanning direction between the light beam spots such that a distance in the sub-scanning direction between a first light beam spot and a second light beam spot formed on a first and second ones of the plurality of photosensitive media, respectively, is substantially one half of a cycle of scan lines in the sub-scanning direction.

The scanner may comprise a micro electro-mechanical system (MEMS) structure configured to rotationally oscillate in a sinusoidal manner.

The at least one pair of oppositely facing mirrors may comprise a first pair of oppositely facing mirrors and a second pair of oppositely facing mirrors. The first pair of oppositely facing mirrors may include a first mirror that faces a first direction and a second mirror facing a second direction opposite to the first direction. The second pair of oppositely facing mirrors may include a third mirror facing the first direction and a fourth mirror facing the second direction.

The at least one pair of oppositely facing mirrors may alternatively include a first mirror that faces a first direction and a second mirror facing a second direction opposite to the first direction. A time difference between a first scan start time of a first light beam deflected by the first mirror and a second scan start time of a second light beam deflected by the second mirror may be an odd multiple of half of an oscillation period of the scanner.

The plurality of monochromatic images being overlapped on a transfer medium that may be configured to move. The at least one pair of oppositely facing mirrors may include a first mirror that faces a first direction and a second mirror facing a second direction opposite to the first direction. A first light beam spot formed on a first one of the plurality of photosensitive media by a first light beam reflected from the first mirror being spaced apart in the sub-scanning direction from a second light beam spot formed on a second one of the plurality of photosensitive media by a second light beam reflected from the second mirror by a distance by which the transfer medium moves during a time duration that is an odd multiple of one half of an oscillation period of the scanner.

The light scanning unit may be configured to scan four light beams.

The plurality of monochromatic images formed on the plurality of photosensitive devices include yellow (Y), magenta (M), cyan (C) and black (K) images.

According to another aspect, there is provided a method of correcting a color registration error in an image forming apparatus that forms a color image by overlapping a plurality of monochromatic images received from a plurality of photosensitive media. The method may comprise the steps of scanning a plurality of light beams respectively across surfaces of the plurality of photosensitive media in one or more scanning lines that extend along a main scanning direction by rotationally oscillating a scanner having a first mirror that faces a first direction and a second mirror facing a second direction opposite to the first direction such that at least a first one of the plurality of light beams is deflected by the first mirror, and such that at least a second one of the plurality of light beams is deflected by the second mirror; and adjusting a distance, in a sub-scanning direction substantially parallel to the main scanning direction, between light beam spots formed on the plurality of photosensitive media by the plurality of light beams so as to correct a color registration error.

The step of adjusting the distance in the sub-scanning direction between the light beam spots may comprise providing a first light beam source and a second light beam source for each of the plurality of photosensitive media, respective optical paths of the first and second light beam sources being spaced apart from each other in the sub-scanning direction; and selecting one of the first and second light beam sources for scanning a corresponding one of the plurality of photosensitive media.

The step of adjusting the distance in the sub-scanning direction between the light beam spots may alternatively comprise repositioning at least one optical devices disposed along an optical path between at least one of the plurality of photosensitive media and a light source associated with the at least one plurality of photosensitive media so as to cause an optical path of a light beam received by the at least one of the plurality of photosensitive media to change in the sub-scanning direction.

The step of adjusting the distance in the sub-scanning direction between the light beam spots may alternatively comprise causing a first light beam spot formed on a first one of the plurality of photosensitive media to be spaced apart in the sub-scanning direction from a second light beam formed on a second one of the plurality of photosensitive media by an adjusted distance that is corresponds to a half of one cycle of scan lines in the sub-scanning direction.

The method may further comprise timing respective start times for scanning of the plurality of light beams such that a first scan starting time of a first one of the plurality of light beams deflected off the first mirror being delayed from a second scan starting time of a second one of the plurality of light beams deflected off the second mirror by a time difference that corresponds to an odd multiple of one half of an oscillation cycle of the scanner.

According to yet another aspect, there is provided an image forming apparatus for forming a color image by overlapping a plurality of monochromatic images respectively received from a plurality of photosensitive media. The apparatus may comprise a light scanning unit and a controller. The light scanning unit may include a scanner that includes a first mirror facing a first direction and a second mirror facing a second direction opposite the first direction. The scanner may be configured to cyclically oscillate at an oscillation period such that a first one of a plurality of light beams is deflected by the first mirror so as to be scanned across one or more scanning lines on a first one of the plurality of photosensitive media along a main scanning direction, and such that a second one of the plurality of light beams is deflected by the second mirror so as to be scanned across one or more scanning lines on a second one of the plurality of photosensitive media along the main scanning direction. The controller may be configured to control the light scanning unit such that a first scan start time of scanning of the first one of the plurality of light beams on the first one of the plurality of photosensitive media is delayed from a second scan start time of scanning of the second one of the plurality of light beams on the second one of the plurality of photosensitive media by a time duration that correspond substantially to an odd multiple of one half of the oscillation period, and such that a first light beam spot and a second light beam spot formed respectively by any two of the plurality of light beams on any two corresponding ones of the plurality of photosensitive media is spaced apart from each other along a sub-scanning direction substantially perpendicular to the main scanning direction by a distance that corresponds substantially to one half of a gap between two consecutive ones of the one or more scanning lines along the main scanning direction.

BRIEF DESCRIPTION OF THE DRAWINGS

Various features and advantages of the present disclosure will become more apparent by describing in detail several embodiments thereof with reference to the attached drawings, in which.

DETAILED DESCRIPTION OF SEVERAL EMBODIMENTS

Reference will now be made in detail to the embodiment, examples of which are illustrated in the accompanying drawings, wherein like reference numerals refer to like elements throughout. While the embodiments are described with detailed construction and elements to assist in a comprehensive understanding of the various applications and advantages of the embodiments, it should be apparent however that the embodiments can be carried out without those specifically detailed particulars. Also, well-known functions or constructions will not be described in detail so as to avoid obscuring the description with unnecessary detail. It should be also noted that in the drawings, the dimensions of the features are not intended to be to true scale and may be exaggerated for the sake of allowing greater understanding.

Figure 1:
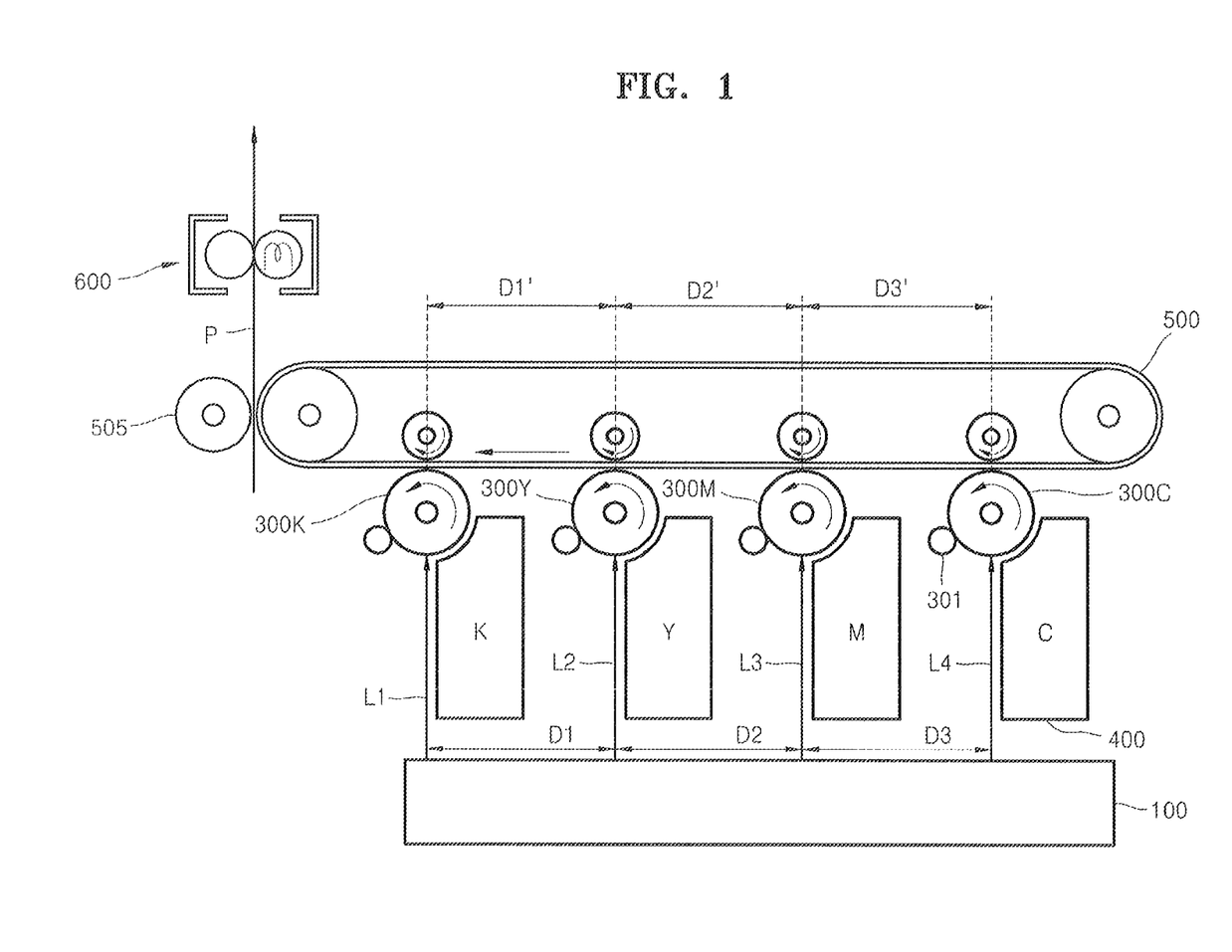
FIG. 1 illustrates an image forming apparatus according to an embodiment of the present disclosure.

FIG. 1 illustrates an image forming apparatus according to an embodiment of the present disclosure. Referring to FIG. 1, the image forming apparatus can include a light scanning unit 100, a first photosensitive drum 300K, a second photosensitive drum 300Y, a third photosensitive drum 300M, a fourth photosensitive drum 300C, multiple developing units 400, an intermediate transfer belt 500 and a fixing unit 600.

The light scanning unit 100 can be configured to scan a first light beam L1, a second light beam L2, a third light beam L3 and a fourth light beam L4, each of which can be modulated according to image information. The light scanning unit 100 can scan the first through fourth light beams L1, L2, L3 and L4 to the first through fourth photosensitive drums 300K, 300Y, 300M and 300C, respectively. As shown in FIG. 1, four different colors can be used to form a color image. For this purpose, the light scanning unit 100 can scan the first through fourth light beams L1, L2, L3 and L4, which may be modulated with information that correspond to black (K), yellow (Y), magenta (M) and cyan (C) image information, respectively.

As further described below, the light scanning unit 100 can be configured to scan the first through fourth light beams L1, L2, L3 and L4 by using a double-sided mirror scanner 150 (see FIG. 5). The light scanning unit 100 can be configured to adjust distances along a sub-scanning direction, D1, D2 and D3. Such distances can be associated with the distances between the respective light beam spots of the first through fourth light beams L1, L2, L3 and L4 formed on the first through fourth photosensitive drums 300K, 300Y, 300M and 300C.

Because the light scanning unit 100 can be configured to deflect the first through fourth light beams L1, L2, L3 and L4 by using the double-sided mirror scanner 150, the direction in which the first light beam L1 and the second light beam L2 are scanned and the direction in which the third light beam L3 and the fourth light beam L4 are scanned can be different, e.g., opposite, from each other. As a result of this difference in directions, a color registration error can occur because of the zigzagging manner in which the light beams are scanned. Moreover, errors in color registration can occur from variations in the tolerances, errors during the assembly of the parts into the image forming apparatus and/or by the deformation during the use of the image forming apparatus. The image forming apparatus of FIG. 1 can be configured to correct such color registration errors by adjusting various distances in the sub-scanning direction between the first through fourth light beams L1, L2, L3 and L4 scanned by the light scanning unit 100. A method of correcting color registration error according to an embodiment is described below in detail.

Each of the first through fourth photosensitive drums 300K, 300Y, 300M and 300C can be made by, for example, disposing a photosensitive layer having a predetermined thickness on an outer circumferential surface of a cylindrical metal pipe. The outer circumferential surfaces of the first through fourth photosensitive drums 300K, 300Y, 300M and 300C are surfaces upon which the first through fourth light beams L1, L2, L3 and L4 can be incident when scanned by the light scanning unit 100. A photosensitive belt (not shown) can alternatively be used as a photosensitive medium. Charging rollers 301 can be configured to charge the outer circumferential surfaces of the first through fourth photosensitive drums 300K, 300Y, 300M and 300C to a uniform electrical potential as the rollers rotate in contact with the respective one of the first through fourth photosensitive drums 300K, 300Y, 300M and 300C. Each of the developing units 400 can be disposed to correspond to one of the first through fourth photosensitive drums 300K, 300Y, 300M and 300C, and can be configured to accommodate one of black (K), yellow (Y), magenta (M), and cyan (C) toners therein. After the electrostatic latent images are formed by the light scanning unit 100 on the first through fourth photosensitive drums 300K, 300Y, 300M and 300C, the electrostatic latent images can be developed by using the developing units 400 to form black (K), yellow (Y), magenta (M) and cyan (C) toner images.

The intermediate transfer belt 500 can be configured to transfer the different monochromatic toner images formed on the first through fourth photosensitive drums 300K, 300Y, 300M, and 300C to a print medium P (e.g., paper). In some embodiments, a drum type transfer unit may alternatively be used as a transfer medium. The intermediate transfer belt 500 can be rotated at a predetermined speed so as to receive the toner images formed on the first through fourth photosensitive drums 300K, 300Y, 300M, and 300C, sequentially and overlapping one another, and can transfer the superimposed toner images to the print medium P. The toner images can be transferred to the print medium P by applying a transfer bias voltage to a transfer roller 505 while the printing medium P is conveyed between the transfer roller 505 and the intermediate transfer belt 500. The toner images transferred to the print medium P can be fused to the print medium P by the fixing unit 600 using heat and pressure, thereby completing an image forming operation.

Figure 2:
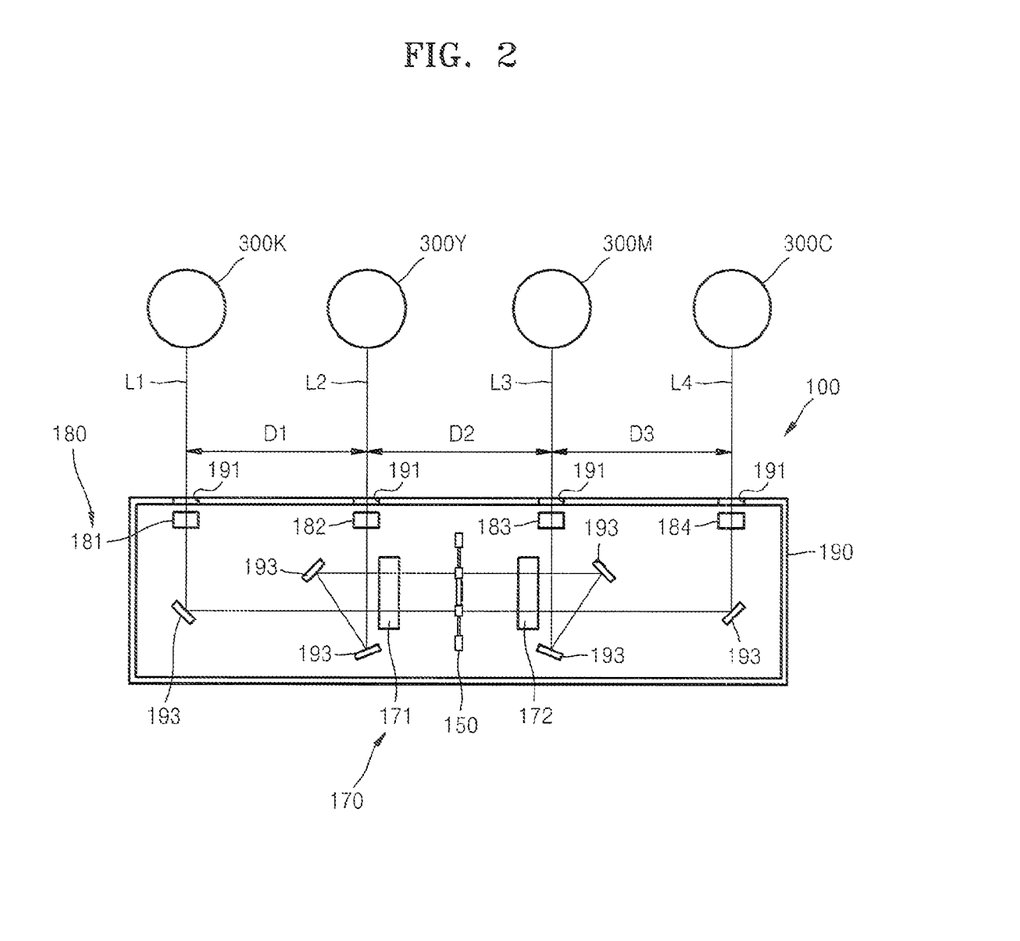
FIG. 2 is a cross-sectional view of a light scanning unit included in the image forming apparatus of FIG. 1 taken along a sub-scanning direction.
Figure 3:
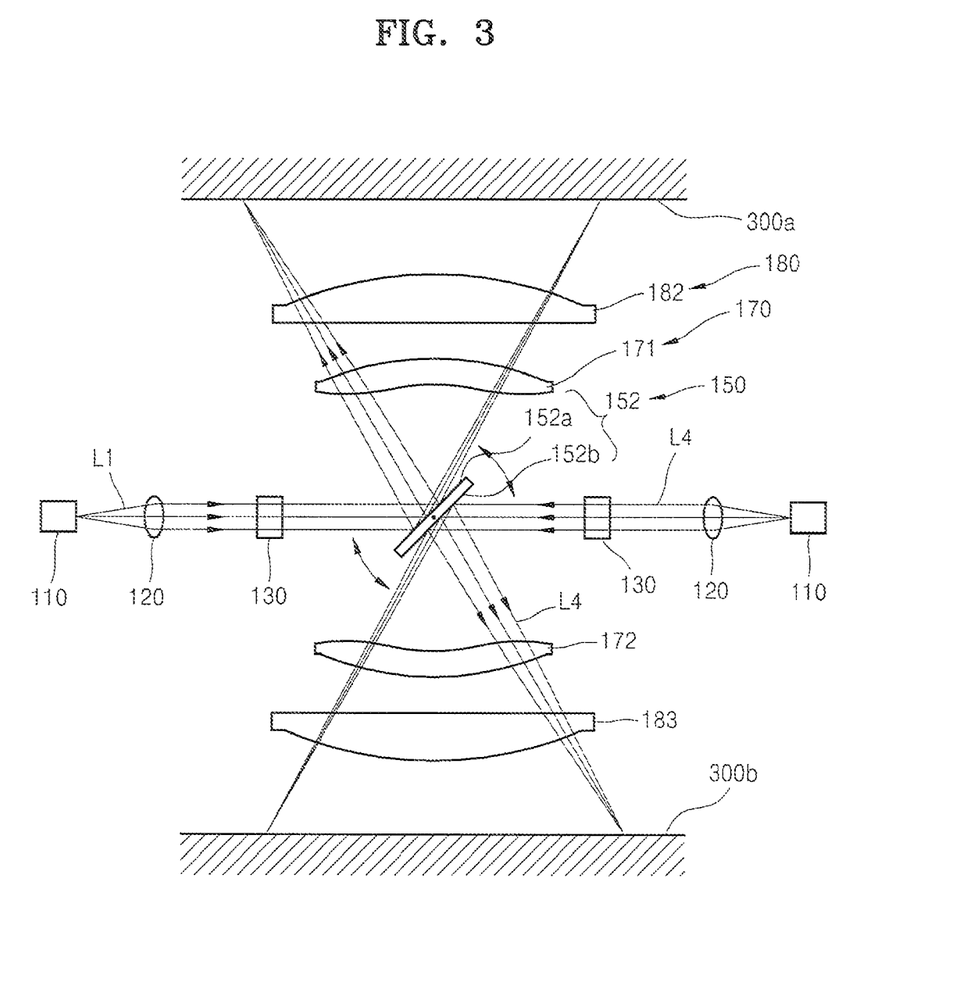
FIG. 3 is a cross-sectional view of the light scanning unit included in the image forming apparatus of FIG. 1 taken along a main scanning direction.

FIG. 2 is a cross-sectional view of an embodiment of the light scanning unit 100 employable in the image forming apparatus of FIG. 1 taken along a line in the sub-scanning direction. FIG. 3 is a cross-sectional view of an embodiment of the light scanning unit 100 that can be used in the image forming apparatus of FIG. 1 taken along a line in the main scanning direction. While for brevity, only two scanned surfaces 300a and 300b are illustrated in FIG. 3, it should be understood that the two surfaces 300a and 300b may represent, respectively, the outer circumferential surfaces of the second and third photosensitive drums 300Y and 300M, or the outer circumferential surfaces of the first and fourth photosensitive drums 300K and 300C. For convenience, in FIG. 3, mirrors 193 (see FIG. 2) for changing the optical path are not shown, and only the optical system located on optical paths of the first light beam L1 and the fourth light beam L4 deflected by a first double-sided mirror 152 (see FIG. 5) is shown.

Referring to FIGS. 2 and 3, the light scanning unit 100 can include a light source unit 110, a pre-scan optical system, a double-sided mirror scanner 150, a post-scan optical system, and a housing 190 configured to enclose the light source unit 110, the pre-scan optical system, the double-sided mirror scanner 150 and the post-scan optical system.

The light source unit 110 can include first through fourth light sources, which emit the first through fourth light beams L1, L2, L3 and L4 modulated according to black (K), yellow (Y), magenta (M), and cyan (C) image information, respectively.

To adjust the distances D1, D2 and/or D3 in the sub-scanning direction between the respective light beam spots formed on the first through fourth photosensitive drums 300K, 300Y, 300M and 300C, the light source unit 110 can select between the initially set optical paths of the first through fourth light beams, L1, L2, L3 and L4, and the adjusted optical paths of first through fourth light beams L1', L2', L3' and L4' (see FIG. 5), which are spaced apart from the optical paths L1, L2, L3 and L4 in the main scanning direction.

Figure 4:
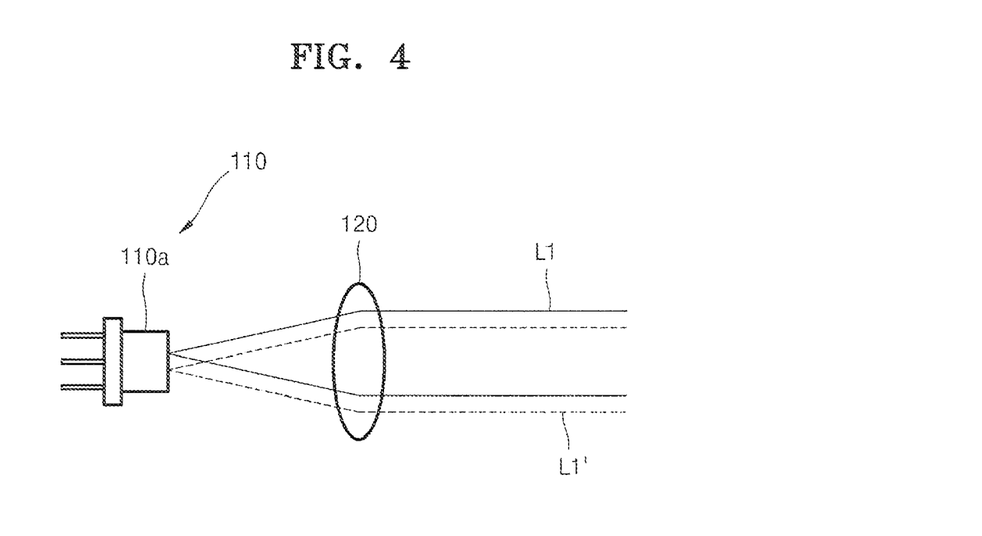
FIG. 4 illustrates a light source unit included in the light scanning unit of FIG. 2, according to an embodiment of the present disclosure.

To this end, the light source unit 110 can use a multi-beam emitting device for each of the first through fourth light sources corresponding, respectively, to the first through fourth photosensitive drums 300K, 300Y, 300M and 300C. According to an embodiment, each multi-beam emitting device used as a light source can have two light emitting points. For example, the multi-beam emitting device can be a multi-beam laser diode (LD) including multiple active layers. FIG. 4 illustrates a first light source 110a according to an embodiment associated with the first photosensitive drum 300K. The first light source 110a can have two light emitting points, and can be configured to emit light in a first optical path associated with a light beam L1 when emitting the light from one of the light emitting points, or in a second optical path associated with a light beam L1' when emitting the light from the other of the light emitting points.

The positions of the two light emitting points of the first light source 110a can be determined so that spots of the light beams L1 and L1', which correspond to light emitted by the two light emitting points of the first light source 110a and incident on the scanned surface 300a (see FIG. 3), can be arranged or configured to be variable in the sub-scanning direction. The distance or spacing between the two light emitting points of the first light source 110a can be determined so that the distance between the respective spots of the light beams L1 and L1' is about ½ of one cycle of the scan lines in the sub-scanning direction. One cycle of scan lines in the sub-scanning direction can refer to the distance in the sub-scanning direction between scan lines that are formed on the scanned surface 300a by light beams scanned during one oscillation of the double-sided mirror scanner 150, as described below with reference to FIG. 6. That is, the light emitted from one of the two light emitting points of the first light source 110a can be offset by ½ of one cycle in the sub-scanning direction from the light emitted by the other of the two light emitting points of the first light source 110a incident upon the scanned surface 300a. The second through fourth light sources corresponding to the second through fourth photosensitive drums 300Y, 300M and 300C can have substantially the same configuration as that of the first light source 110a.

Figure 5:
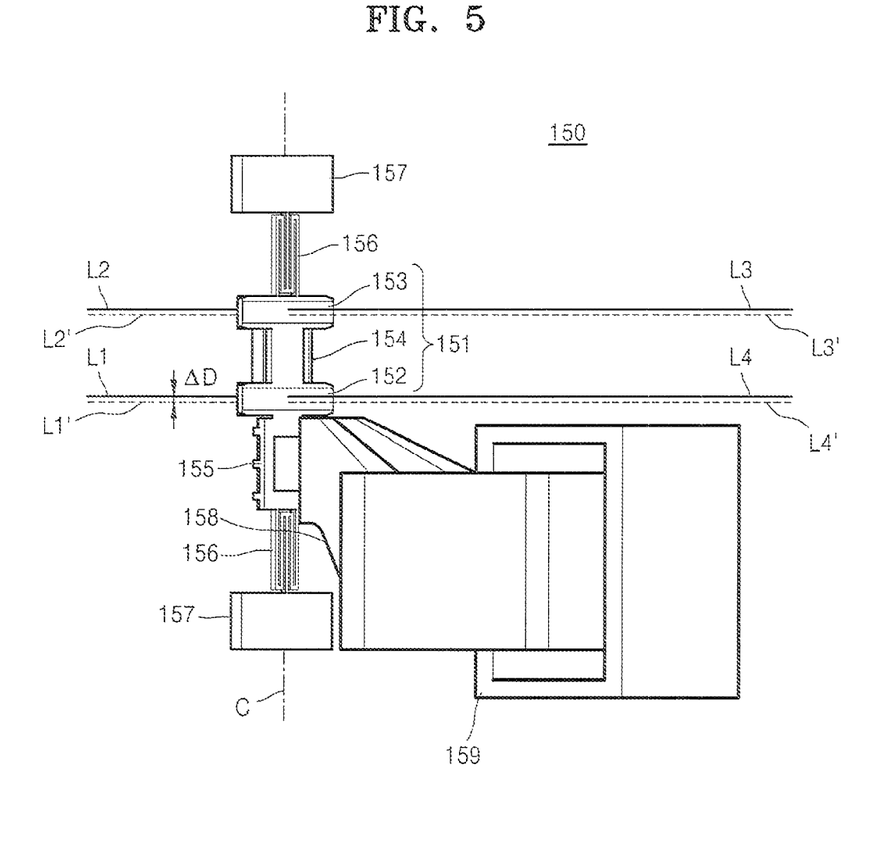
FIG. 5 illustrates a double-sided mirror scanner included in the light scanning unit of FIG. 2.

Although each of the light sources of the light source unit 110 in FIG. 5 can be a multi-beam emitting device having two light emitting points, the present disclosure need not be limited thereto. In other embodiments, a multi-beam emitting device having three or more light emitting points can also be used. In such embodiments, the distance between the three light emitting points can be determined so that the distance between spots formed on the scanned surface 300a is less than ½ of one cycle of scan lines in the sub-scanning direction.

Because the first and second light beams, L1 and L2, and the third and fourth light beams, L3 and L4, can be scanned in opposite directions, as described below, a time difference that occurs between the scan start time of the first and second light sources and the scan start time of the third and fourth light sources can be odd multiples of half of one oscillation period of the double-sided mirror scanner 150. The scan start time of the first and second light sources and the scan start time of the third and fourth light sources are described in more detail below when a correction of a color registration error of the image forming apparatus according to an embodiment us described with reference to FIGS. 6-9.

Referring to FIGS. 2 and 3 again, the pre-scan optical system can include a collimating lens 120 and a cylindrical lens 130, both of which can be disposed in an optical path defined between the light source unit 110 and the double-sided mirror scanner 150. The collimating lens 120 can be a lens configured to collimate a light beam, such as the first through fourth light beams L1, L2, L3 and L4, emitted by the light source unit 110. The cylindrical lens 130 can be an anamorphic lens having a predetermined power in the sub-scanning direction. The cylindrical lens 130 can be configured to focus a light beam, such as the first through fourth light beams L1, L2, L3 and L4 emitted by the light source unit 110, on the double-sided mirror scanner 150. The pre-scan optical system allows the first through fourth light beams L1, L2, L3 and L4 incident respectively on the first mirror surfaces 152a and 153a and the second mirror surfaces 152b and 153b (see FIG. 5) of the double-sided mirror scanner 150 to have cross-sections that are long in the main scanning direction and that are short in the sub-scanning direction. As a result, aberration between the first through fourth light beams L1, L2, L3 and L4 resulting from deflection can be corrected, the sizes of the first mirror surfaces 152a and 153a, and of the second mirror surfaces 152b and 153b, of the double-sided mirror scanner 150 can be reduced, and the oscillation characteristics of the double-sided mirror scanner 150 can be improved.

The double-sided mirror scanner 150 can be a micro electro-mechanical system (MEMS) structure including a double-sided mirror that oscillates in a sinusoidal fashion. FIG. 5 illustrates an embodiment of a double-sided mirror scanner 150. Referring to FIG. 5, the double-sided mirror scanner 150 can include a double-sided mirror unit 151, a permanent magnet unit 155, a pair of springs 156, a pair of fixing ends 157, a yoke 158, and a coil 159 wound around the yoke 158.

The double-sided mirror unit 151 can include a first double-sided mirror 152, a second double-sided mirror 153, and a connecting portion 154 configured to couple together the first double-sided mirror 152 and the second double-sided mirror 153. The springs 156 can couple the double-sided mirror unit 151 with the fixing ends 157, and can be configured to elastically support both ends of the double-sided mirror unit 151. The fixing ends 157 can be configured to support the springs 156. The permanent magnet unit 155, the yoke 158, which is disposed to oppose to the permanent magnet unit 155, and the coil 159, which is wound around the yoke 158, can collectively act as a driving unit configured to drive the double-sided mirror unit 151 using an electromagnetic force. The yoke 158 and the coil 159 can periodically apply an electromagnetic force to the double-sided mirror unit 151 through electromagnetic interaction with a permanent magnet in the permanent magnet unit 155. Because of the periodic electromagnetic force and the elastic restoring force of the springs 156, the double-sided mirror unit 151 can oscillate in a sinusoidal fashion about the C axis.

Because the double-sided mirror scanner 150 of FIG. 5 can scan in two opposite directions by using the first double-sided mirror 152 and the second double-sided mirror 153, the scanning directions of the first through fourth light beams L1, L2, L3 and L4 can be different. In an embodiment, the first and second light beams L1 and L2 can be made to be incident, respectively, upon the first mirror surfaces 152a of the first double-sided mirror 152 and the first mirror surface 153a of the second double-sided mirror 153, which face the same direction, and can thus be scanned in the same direction. Similarly, the third and fourth light beams L3 and L4 can be incident, respectively, upon the second mirror surface 152b of the first double-sided mirror 152 and the second mirror surface 153b of the second double-sided mirror 153, which face the same direction, and can thus be scanned in the same direction. With the first mirror surfaces 152a and 153a and the second mirror surfaces 152b and 153b facing opposite directions with respect to each other, the direction in which the first and second light beams L1 and L2 are scanned may be opposite to the direction in which the third and fourth light beams L3 and L4 are scanned.

Because the first through fourth light beams L1, L2, L3 and L4 can be scanned periodically, directions in which the first through fourth light beams L1, L2, L3 and L4 are scanned can be represented by a phase difference. That is, while the first and second light beams L1 and L2 can be considered as being scanned in-phase with each other, and while the third and fourth light beams L3 and L4 can be considered as being scanned in-phase with each other, there can be a phase difference of 180 degrees between the scanning of the first and second light beams L1 and L2 and scanning of the third and fourth light beams L3 and L4 such that the scanning in one direction is out of phase with the scanning in the other direction. By having the double-sided mirror scanner 150 scan in two opposite directions using the first double-sided mirror 152 and the second double-sided mirror 153, a color registration error can be caused by the resulting zigzag scanning as described further below.

The size of the light scanning unit 100 (see FIG. 1) can be reduced because the double-sided mirror scanner 150 is a small MEMS structure that can be manufactured by a MEMS process. Although the double-sided mirror scanner 150 can be configured such that the first double-sided mirror 152 and the second double-sided mirror 153 can be concurrently driven as shown in FIG. 5, in other embodiments, each of the first double-sided mirror 152 and the second double-sided mirror 153 can be an independent MEMS structure, and can be driven individually. Although the double-sided mirror scanner 150 includes the first double-sided mirror 152 and the second double-sided mirror 153, the number of double-sided mirrors included in the double-sided mirror scanner 150 can be more than two when appropriate based on the number of light beams to be scanned. In the embodiment shown with respect to FIG. 5, the first through fourth light beams L1, L2, L3 and L4 are substantially parallel when incident on the first double-sided mirror 152 and the second double-sided mirror 153. In other embodiments, however, the first through fourth light beams L1, L2, L3 and L4 can be incident obliquely, and in such embodiments, the first through fourth light beams L1, L2, L3 and L4 can be scanned by using a single double-sided mirror.

Referring to FIGS. 2 and 3, the post-scan optical system can include a common lens unit 170 and an individual lens unit 180, which are disposed between the light source 110 and the first through fourth photosensitive drums 300K, 300Y, 300M, and 300C. Also shown in FIG. 2 are multiple mirrors 193, each configured to bend or change the direction of the optical path. The common lens unit 170 can include a first common lens 171 and a second common lens 172. The first common lens 171 can be common to the first light beam L1 and the second light beam L2 while the second common imaging lens 172 can be common to the third light beam L3 and the fourth light beam L4. Because the first double-sided mirror 152 and the second double-sided mirror 153 can be disposed adjacent to each other, the first common lens 171 and the second common lens 172 can each be made to have a small size. Moreover, using the common lens unit 170 can reduce the number of optical components needed and the light scanning unit 100 can be reduced in size (e.g., miniaturized). The individual lens unit 180 can include a first individual lens 181, a second individual lens 182, a third individual lens 183 and a fourth individual lens 184, which are disposed on optical paths associated with the first through fourth light beams L1, L2, L3 and L4, respectively.

The post-scan optical system can be configured to focus the first through fourth light beams L1, L2, L3 and L4 onto the scanned surfaces of the first through fourth photosensitive drums 300K, 300Y, 300M and 300C, respectively. Because the first through fourth light beams L1, L2, L3 and L4 are deflected by the double-sided mirror scanner 150, and because the double-sided mirror scanner 150 oscillates in a sinusoidal fashion, the speeds at which the first through fourth light beams L1, L2, L3 and L4 are scanned have a sinusoidal behavior. Thus, the post-scan optical system may be provided to apply an inverse sinusoidal or arc-sinusoidal function so that the first through fourth light beams L1, L2, L3 and L4 can be captured on the scanned surfaces of the first through fourth photosensitive drums 300K, 300Y, 300M and 300C at uniform speeds. Although the post-scan optical system can be configured such that two lenses are disposed on each optical path as described in FIGS. 2 and 3, the present disclosure need not be limited thereto, and when appropriate, one lens, or three or more lenses, can be disposed on each optical path. Moreover, an individual lens can be disposed on each optical path without a common lens being placed on the same optical path.

The light source unit 110, the pre-scan optical system, the double-sided mirror scanner 150 and the post-scan optical system can be properly contained within the housing 190 by use of the mirrors 193. Even though optical paths are bent by the mirrors 193, because the directions in which the first through fourth light beams L1, L2, L3 and L4 are scanned by the double-sided mirror scanner 150 are not changed, a phase difference between a first group of light beams including the first and second light beams L1 and L2 and a second group of light beams including the third and fourth light beams L3 and L4 can be maintained. Windows 191 can be formed in the housing 190 such that each of the first through fourth light beams L1, L2, L3 and L4 can be emitted through respective corresponding one of the windows 191. The present disclosure need not be limited to the detailed structures of the pre-scan optical system and the post-scan optical system described above, and various modifications can be made to at least such structures.

Correction of a color registration error in the image forming apparatus is described below with reference to FIG. 1 and FIGS. 6-9.

Figure 6:
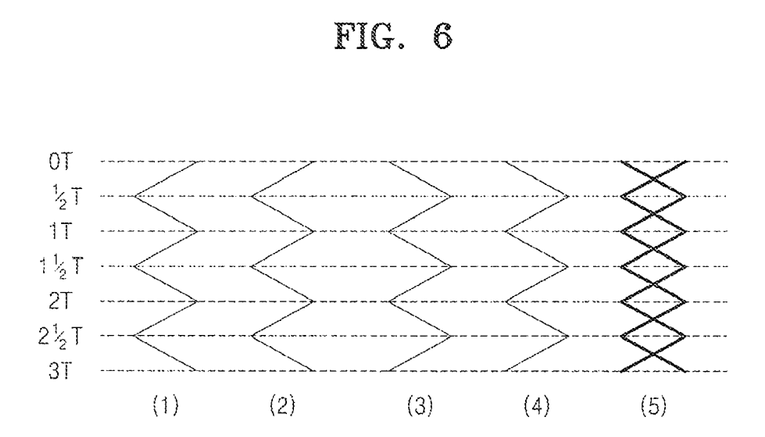
FIG. 6 illustrates trajectories of light beams formed on four scanned surfaces by the double-sided mirror scanner of FIG. 5.

In FIG. 6, plots (1), (2), (3) and (4) show the respective trajectories or scan paths of the first through fourth light beams L1, L2, L3 and L4 on the scanned surfaces of the first through fourth photosensitive drums 300K, 300Y, 300M and 300C by using the double-sided mirror scanner 150 of FIG. 5 when the first through fourth light beams L1, L2, L3 and L4 are scanned simultaneously. In FIG. 6, plot (5) represents a color registration error that is typically caused when monochromatic images formed on the first through fourth photosensitive drums 300K, 300Y, 300M and 300C overlap with one another in a zigzagging fashion.

Referring to plots (1), (2), (3), and (4) of FIG. 6, the first light beam L1 and the second light beam L2 can be scanned in-phase with each other while the third light beam L3 and the fourth light beam L4 can be scanned in-phase with each other. However, there can be a phase difference of 180 degrees by which the first and second light beams L1 and L2 are out of phase with the third and fourth light beams L3 and L4. This phase difference occurs because, as described above, the double-sided mirror scanner 150 can scan in two opposite directions by using the first double-sided mirror 152 and the second double-sided mirror 153.

Because the first and second light beams L1 and L2 are scanned out of phase with respect to the third and fourth light beams L3 and L4, monochromatic images overlapping with one another on the intermediate transfer belt 500 can be misaligned, thereby causing a color registration error as shown in plot (5) of FIG. 6. Such color registration error caused by zigzag scanning can be corrected by adjusting the scan start times of the light source unit 110 (see FIGS. 3 and 4).

Figure 7:
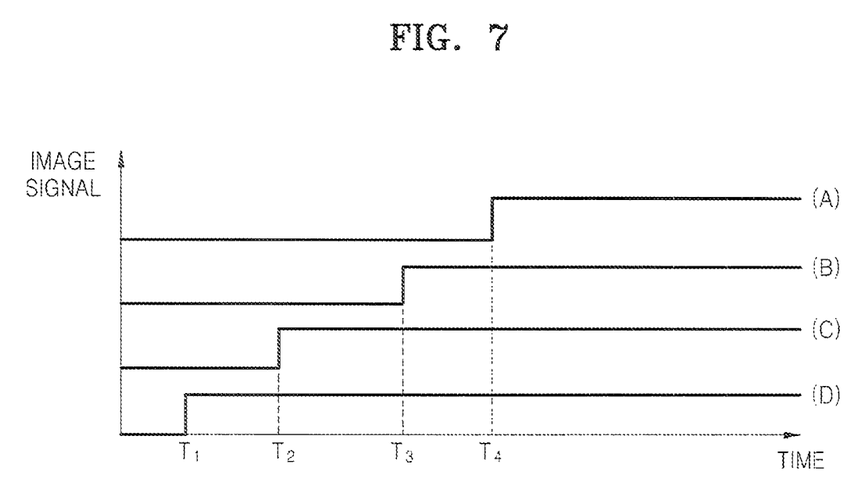
FIG. 7 illustrates exposure timings of four light sources of a light scanning unit.
Figure 8:
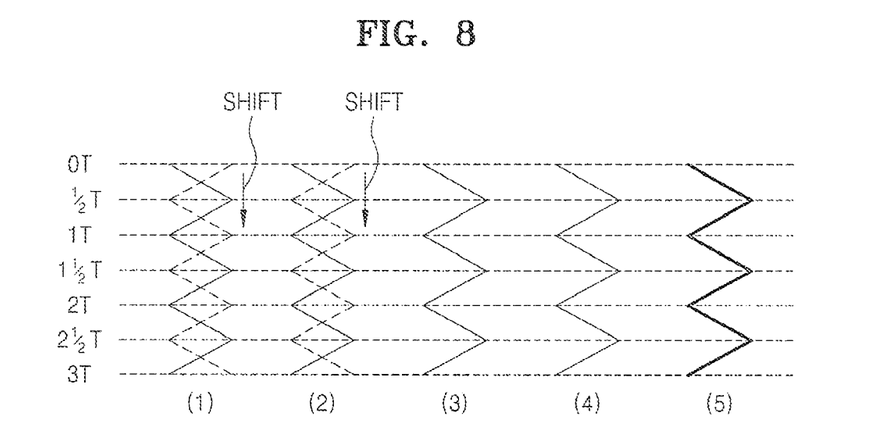
FIG. 8 is illustrative of correction of a color registration error, which may be a result of zigzag scanning, according to an embodiment of the present disclosure.

FIG. 7 illustrates exposure timings of the first through fourth light sources of the light scanning unit 110. FIG. 8 is illustrative of an embodiment of the correction of a color registration error caused by zigzag scanning.

In FIG. 7, plots (A), (B), (C), and (D) show the exposure timings of the first through fourth light sources, respectively. Referring to FIG. 7, scan start times of the first through fourth light sources can be made to differ with respect to each other so that cyan (C), magenta (M), yellow (Y) and black (K) images can properly overlap with one another on the intermediate transfer belt 500.

Referring to FIGS. 1 and 7, as the intermediate transfer belt 500 is rotated, the monochromatic images are transferred to the intermediate transfer belt 500 from the first through fourth photosensitive drums 300K, 300Y, 300M and 300C in the order of cyan (C), magenta (M), yellow (Y) and then black (K). The light source unit 110 (see FIG. 3) can start light exposure in the following order: the fourth light source at time T1, the third light source at time T2, the second light source at time T3, and then the first light source at time T4. According to this embodiment, because the third and fourth light beams L3 and L4 are scanned in-phase with each other, a time interval T2-T1 between the scan start time T2 of the third light source and the scan start time T1 of the fourth light source can be an integer multiple of an oscillation period of the double-sided mirror scanner 150. Similarly, a time interval T4-T3 between the scan start time T4 of the first light source and a scan start time T3 of the second light source can be an integer multiple of the oscillation period of the double-sided mirror scanner 150. Because the second light beam L2 is scanned 180 degrees out of phase with the third light beam L3, a time interval T2-T3 between the scan start time T3 of the second light source and the scan start time T2 of the third light source can be an odd multiple of half (½) of the oscillation period of the double-sided mirror scanner 150.

Distances D1', D2' and D3' (see FIG. 1) between positions where the monochromatic images can be transferred to the intermediate transfer belt 500 from the first through fourth photosensitive drums 300K, 300Y, 300M and 300C can be determined based on the rotational speed of the intermediate transfer belt 500 and the scan start times (e.g., T1, T2, T3 and T4) of the first through fourth light sources.

FIG. 8 illustrates an embodiment of the correction of a color registration error caused by zigzag scanning by adjusting the scan start times of the first through fourth light sources. In FIG. 8, the scan start times of the first light source (T4) and of the second light source (T3) can be delayed by half of the oscillation period of the double-sided mirror scanner 150 when compared to the scan start times of the third light source (T2) and of the fourth light source (T1). Alternatively, the scan start times of the third light source (T2) and of the fourth light source (T1) can be delayed by half of the oscillation period of the double-sided mirror scanner 150 when compared to the scan start times of the first light source (T4) and of the second light source (T3).

A color registration error caused by zigzag scanning can be corrected by adjusting the scan start times of the first through fourth light sources in this way. A color registration error, however, can also be caused by tolerance variations and an assembly imprecision between parts of the image forming apparatus, and/or by the deformation during the use of the image forming apparatus. In a conventional image forming apparatus, it is known to correct a color registration error caused by, for example, tolerance variations or deformation, by arbitrarily adjusting the scan start time of a light source. Because the image forming apparatus according to an aspect of the present disclosure adjusts the scan start times of the first through fourth light sources in a manner described herein for the purpose of correcting the color registration error caused by zigzag scanning when using the double-sided mirror scanner 150, it may be difficult to address a color registration error caused by the assembly imprecision or deformation by further adjusting the scan start times of the light sources. Therefore, the image forming apparatus according to the embodiments described herein can be configured to adjust the first through fourth light beams L1, L2, L3 and L4 scanned by the light scanning unit 100 such that the distances in the sub-scanning direction between the first through fourth light beams L1, L2, L3 and L4 may provide the appropriate correction to a color registration error resulting from, for example, variations or imprecision during assembly and/or deformation during use.

Figure 9:
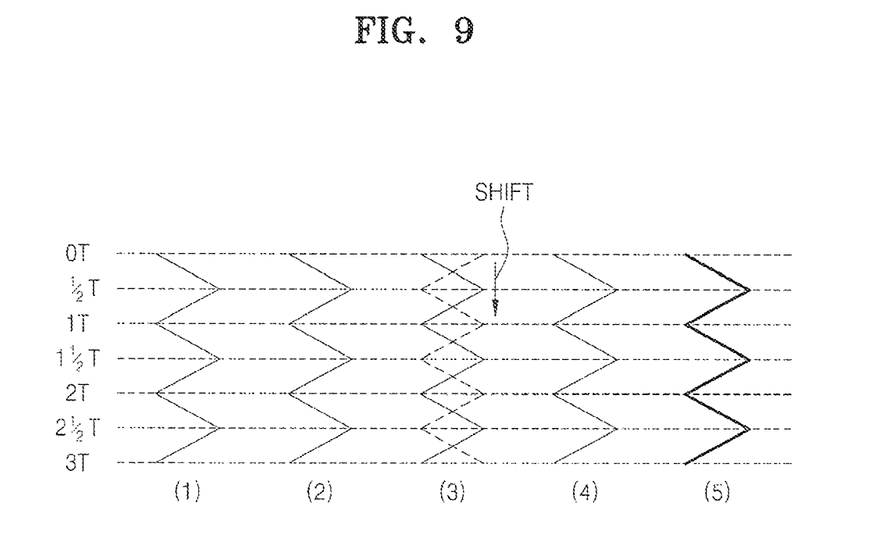
FIG. 9 is illustrative of correction of a color registration error, which may be caused by tolerance variations or deformation, according to an embodiment of the present disclosure.

FIG. 9 is illustrative of an embodiment of the correction of a color registration error that could be caused by assembly variations/imprecision and/or deformation in use. Plots (1), (2) and (4) of FIG. 9 show a color registration error caused by zigzag scanning corrected by applying the method described above with respect to FIG. 8. Plot (3) of FIG. 9 represented by the dotted line indicates a color registration error caused when scan lines are shifted by half (½) of one cycle of the scan lines in the sub-scanning direction as a result of assembly imprecision or deformation during use. Because the respective spots of the first through fourth light beams L1, L2, L3 and L4, formed on the scanned surfaces of the first through fourth photosensitive drums 300K, 300Y, 300M and 300C, can be shifted by half (½) of one cycle of the scan lines in the sub-scanning direction by changing a light emitting point of the light source unit 110, a color registration error caused by manufacturing variations or deformation can be corrected by returning the scan lines to their original positions as shown in plot (3) of FIG. 9 represented by the solid line.

While a color registration error caused by zigzag scanning when using the double-sided mirror scanner 150 can be corrected as described above with respect to FIG. 8 and a color registration error caused by assembly variations or deformation can be corrected as described above with respect to FIG. 9, the present disclosure need not be limited thereto. A color registration error caused by the manufacturing variations or deformation can also occur during the manufacturing of the image forming apparatus or while the image forming apparatus is used. Such color registration error occurring during use can be detected using a known color registration error detection method, and can be corrected by applying the method described above with respect to FIG. 9.

Figure 10:
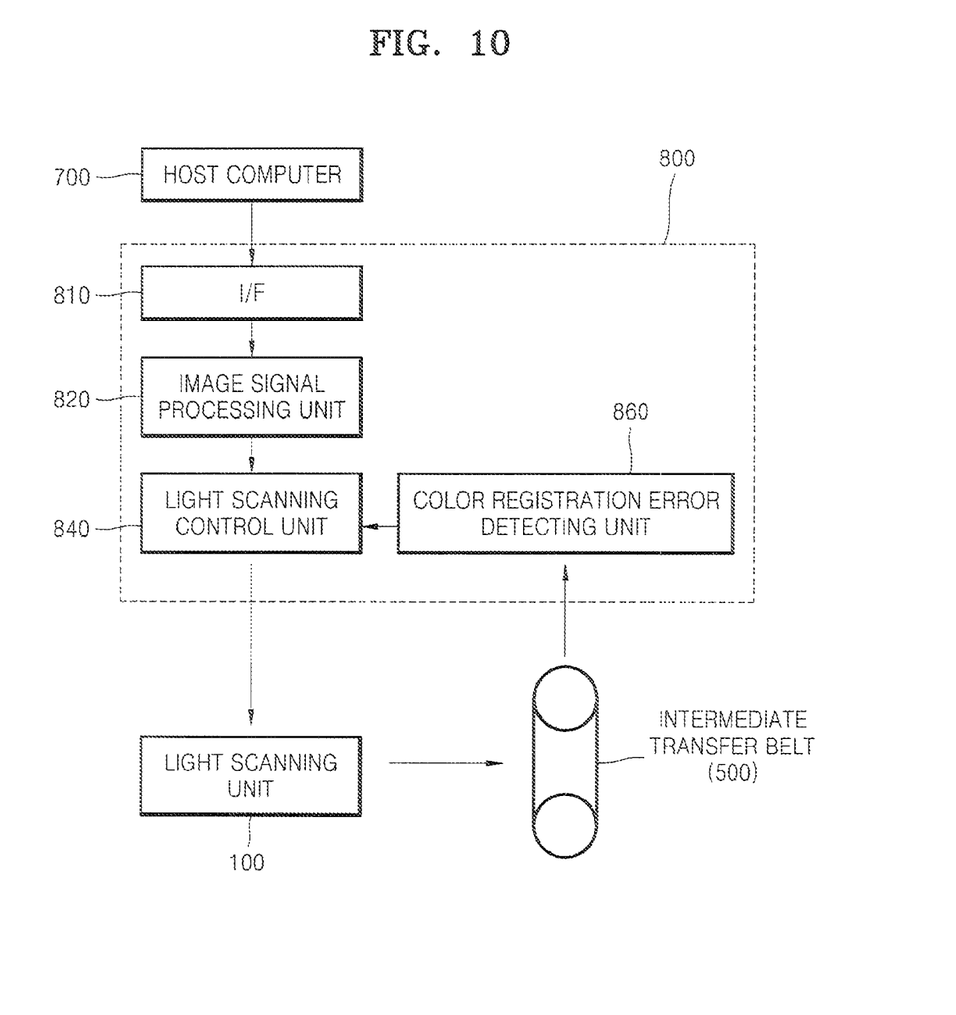
FIG. 10 is a block diagram of a control unit according to an embodiment of the present disclosure that may be employed in the image forming apparatus of FIG. 1.

FIG. 10 is a block diagram of a control unit 800 according to an embodiment that can be employed in the image forming apparatus of FIG. 1.

Referring to FIG. 10, the control unit 800 can be configured to receive image information and control information from a host computer 700, and can control the light scanning unit 100. The control unit 800 can include an interface (I/F) unit 810, an image signal processing unit 820, a light scanning control unit 840 and a color registration error detecting unit 860. The I/F unit 810 can be configured to receive the image information and the control information from the host computer 700, and can transmit the image information and the control information to the image signal processing unit 820. The image signal processing unit 820 can be configured to separate the input image information according to colors. The light scanning control unit 840 can be configured to modulate an output of the light source unit 110 (see FIGS. 3 and 4) of the light scanning unit 100 according to the image information, and can control development and transfer processes, for example. The light scanning control unit 840 can adjust the scan start time of the light source unit 110 in order to correct a color registration error caused by, for example, zigzag scanning when using the double-sided mirror scanner 150. When a color registration error caused by assembly variations or deformation occurs on the intermediate transfer belt 500, the color registration error detecting unit 860 can be configured to detect the color registration error using a known color registration error detection method. Once the color registration error detecting unit 860 detects the color registration error occurred on the intermediate transfer belt 500, the light scanning control unit 840 can correct the color registration error by changing a light emitting point of the light source of the light source unit 110 (see FIG. 4) to adjust distances in the sub-scanning direction between light beams emitted by the light scanning unit 100.

Figure 11:
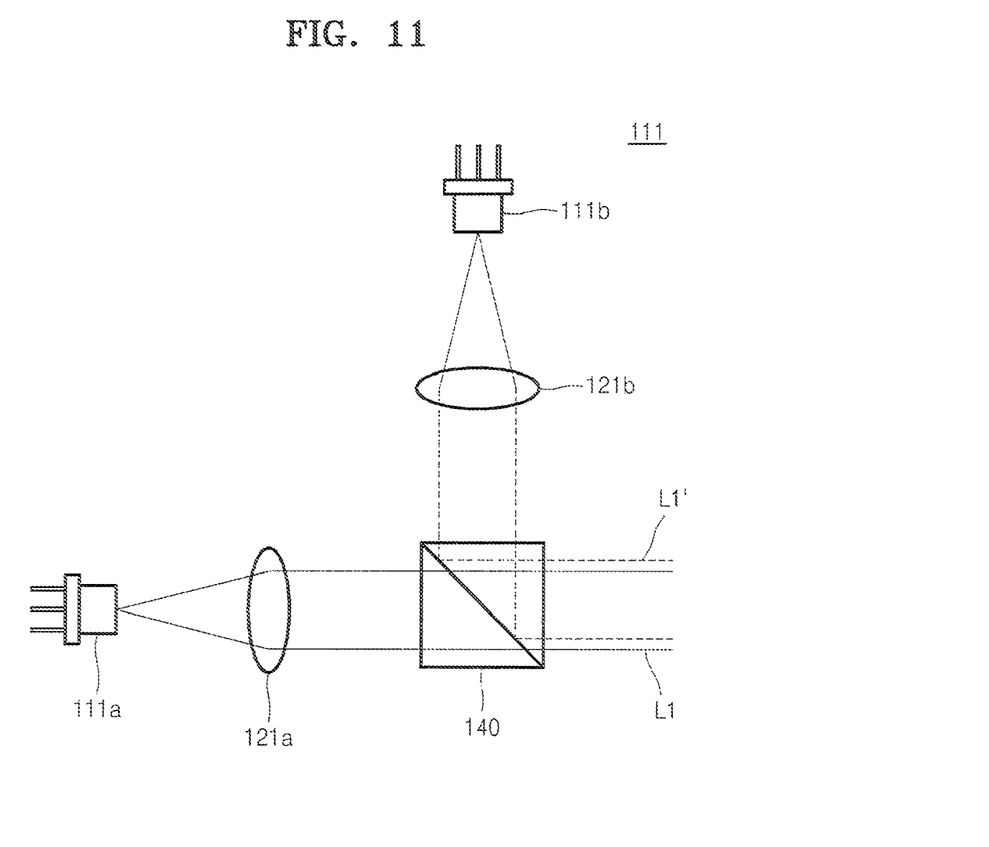
FIG. 11 illustrates a light source unit according to another embodiment of the present disclosure that may be employed in the light scanning unit of FIG. 2.

FIG. 11 illustrates a light source unit 111 according to another embodiment of the present disclosure capable of being employed in the light scanning unit 100 of FIG. 2.

The light scanning unit 100 associated with FIG. 11 can be provided with two single-beam emitting devices for each photosensitive medium. Because the light scanning unit 100 of FIG. 11 can be substantially identical to the light scanning unit 100 of FIGS. 2-5, except for a difference that the light source unit 111 uses two single beam emitting devices instead of one multi-beam emitting device, for each monochromatic image, only the description of the use of multiple single-beam emitting devices in a light scanning unit such as the light scanning unit 100 will be given.

Each light source of the light source unit 111 can include a first single-beam emitting device 111a and a second single-beam emitting device 111b, a first collimating lens 121a, a second collimating lens 121b and an optical path synthesizing device 140. FIG. 11 shows only a first light source of the light source unit 111 of the light scanning unit 100 for convenience. The light source unit 111 can include multiple light sources. Optical paths of the first light beams L1 and L1', which are synthesized by the optical path synthesizing device 140, can be offset or spaced apart from each other so that a distance between spots of the first light beams L1 and L1' formed on the scanned surface 300a (see FIG. 3) is half (½) of one cycle of scan lines in the sub-scanning direction. In this embodiment, a color registration error can be corrected by changing to the first single-beam emitting device 111a or to the second single-beam emitting device 111b to shift the spots formed on the scanned surface 300a in the sub-scanning direction.

For example, the optical path synthesizing device 140 can be a polarizing beam splitter, for example. When the optical path synthesizing device 140 is a polarizing beam splitter, the first single-beam emitting device 111a and the second single-beam emitting device 111b can emit the light beam L1 and the light beam L1', respectively, and the light beam L1 and the light beam L1' are polarized in different directions. Alternatively, the optical path synthesizing device 140 can be a half mirror. Although the first collimating lens 121a and the second collimating lens 121b can be used for the first single-beam emitting device 111a and the second single-beam light emitting device 111b in FIG. 11, respectively, the present disclosure need not be limited thereto. For example, the first collimating lens 121a and the second collimating lens 121b can be disposed on an optical path synthesized by the optical path synthesizing device 140. In the embodiment shown in FIG. 11, the light source unit 111 shown in FIG. 11 can include two single-beam emitting devices for each photosensitive medium. In other embodiments, however, the light source unit 111 can include three or more single-beam emitting devices for each photosensitive medium.

Figure 12:
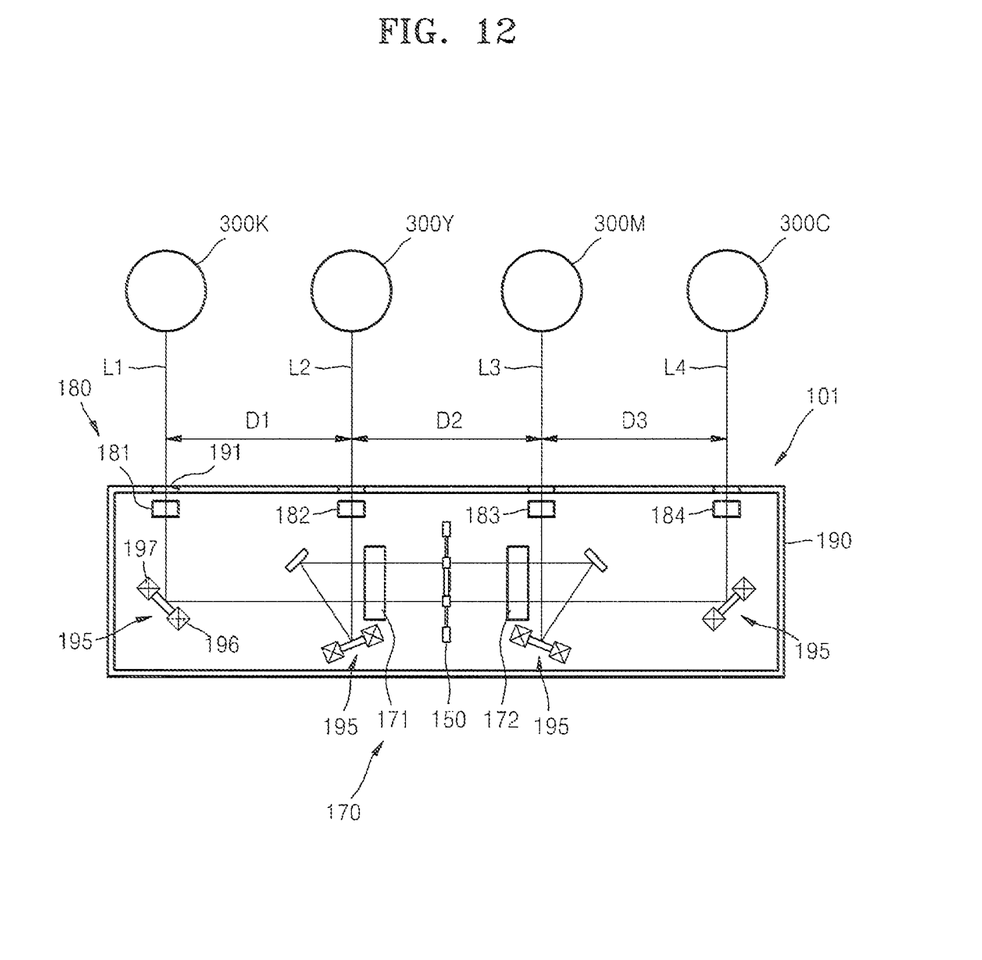
FIG. 12 illustrates a light scanning unit according to another embodiment of the present disclosure that may be employed in the image forming apparatus of FIG. 1.

FIG. 12 illustrates a light scanning unit 101 according to another embodiment of the present invention capable of being employed in the image forming apparatus of FIG. 1.

Referring to FIG. 12, the light scanning unit 101 can be substantially the same as the light scanning unit 100 of FIGS. 2-5, but can use movable reflection mirrors 195 that are disposed on optical paths in the light scanning unit 101 instead of multiple light sources for respective monochromatic images. Using movable reflection mirrors 195 can shift spots formed on the scanned surfaces of the first through fourth photosensitive drums 300K, 300Y, 300M and 300C in the sub-scanning direction.

The light source unit that emits the first through fourth light beams L1, L2, L3 and L4, modulated according to black (K), yellow (Y), magenta (M), and cyan (C) image information, of the light scanning unit 101 can use typical light sources. The pre-scan optical system and the double-sided mirror scanner 150 of FIG. 12 can be substantially similar to the pre-scan optical system and the double-sided mirror scanner 150 of FIGS. 3 and 5. The common lens unit 170 and the individual lens unit 180 included in the post-scan optical system of FIG. 12 can be substantially similar to the common lens unit 170 and the individual lens unit 180 of FIG. 2.

The movable reflection mirror 195 can include a reflection mirror 196 and a mirror driving unit 197 configured to drive the reflecting mirror 196. When the angle of reflection of the reflection mirror 196 is changed, optical paths of the first through fourth light beams L1, L2, L3 and L4 scanned to the first through fourth photosensitive drums 300K, 300Y, 300M and 300C can be changed in the sub-scanning direction. Accordingly, the movable reflection mirrors 195 can shift the light beam spots formed on the scanned surfaces of the first through fourth photosensitive drums 300K, 300Y, 300M and 300C in the sub-scanning direction by changing the angles of reflection of the first through fourth light beams L1, L2, L3 and L4. Because the spots formed on the scanned surfaces of the first through fourth photosensitive drums 300K, 300Y, 300M and 300C can be shifted in the sub-scanning direction by using the movable reflection mirror 195, a color registration error can be corrected.

Although the movable reflection mirror 195 can be disposed in the post-scan optical system as shown in FIG. 12, in other embodiments, the movable reflection mirror 195 can be disposed in the pre-scan optical system between the light source unit 110 and the double-sided mirror scanner 150. The movable reflection mirror 195 can be a device configured to change an optical path of a light beam passing therethrough. Other types of movable devices can be used. For example, the collimating lens 120 or the cylindrical lens 130 in the pre-scan optical system, or the lens of the post-scan optical system can be configured to be used as a movable optical device. That is, an optical path of a passing light beam can be shifted in the sub-scanning direction by attaching a lens driving unit to one or more refraction lenses and having the lens driving unit change a refraction position of the refraction lenses.

While the present disclosure has been particularly shown and described with reference to several embodiments thereof, it will be understood by those of ordinary skill in the art that various changes in form and detail may be made therein without departing from the spirit and scope of the present disclosure as defined by the following claims. The preferred embodiments should be considered in a descriptive sense only and not for purposes of limitation.

What is claimed is:

1. An image forming apparatus for forming an image by overlapping a plurality of monochromatic images respectively received from a plurality of photosensitive media, comprising:
a singular light scanning unit having a double-sided mirror scanner configured to rotationally oscillate, the scanner having at least one pair of oppositely facing mirrors each configured to deflect light, the light scanning unit being configured to scan a plurality of light beams deflected by the at least one pair of oppositely facing mirrors across surfaces of the plurality of photosensitive media along a main scanning direction,
wherein one or more distances, along a sub-scanning direction substantially perpendicular to the main scanning direction, between respective light beam spots formed on the plurality of photosensitive devices by the plurality of light beams are adjustable;
wherein the light scanning unit is configured to adjust the one or more distances along the sub-scanning direction between the light beam spots such that a distance in the sub-scanning direction between a first light beam spot and a second light beam spot formed on a first and second ones of the plurality of photosensitive media, respectively, is substantially one half of a cycle of scan lines in the sub-scanning direction.

2. An image forming apparatus for forming an image by overlapping a plurality of monochromatic images respectively received from a plurality of photosensitive media, comprising:
a singular light scanning unit having a double-sided mirror scanner configured to rotationally oscillate, the scanner having at least one pair of oppositely facing mirrors each configured to deflect light, the light scanning unit being configured to scan a plurality of light beams deflected by the at least one pair of oppositely facing mirrors across surfaces of the plurality of photosensitive media along a main scanning direction,
wherein one or more distances, along a sub-scanning direction substantially perpendicular to the main scanning direction, between respective light beam spots formed on the plurality of photosensitive devices by the plurality of light beams are adjustable;
wherein the scanner comprises a micro electro-mechanical system (MEMS) structure configured to rotationally oscillate in a sinusoidal manner.

3. The image forming apparatus of claim 2, wherein the at least one pair of oppositely facing mirrors comprises a first pair of oppositely facing mirrors and a second pair of oppositely facing mirrors, the first pair of oppositely facing mirrors including a first mirror that faces a first direction and a second mirror facing a second direction opposite to the first direction, the second pair of oppositely facing mirrors including a third mirror facing the first direction and a fourth mirror facing the second direction.

4. An image forming apparatus for forming an image by overlapping a plurality of monochromatic images respectively received from a plurality of photosensitive media, comprising:
a singular light scanning unit having a double-sided mirror scanner configured to rotationally oscillate, the scanner having at least one pair of oppositely facing mirrors each configured to deflect light, the light scanning unit being configured to scan a plurality of light beams deflected by the at least one pair of oppositely facing mirrors across surfaces of the plurality of photosensitive media along a main scanning direction,
wherein one or more distances, along a sub-scanning direction substantially perpendicular to the main scanning direction, between respective light beam spots formed on the plurality of photosensitive devices by the plurality of light beams are adjustable;
wherein the at least one pair of oppositely facing mirrors includes a first mirror that faces a first direction and a second mirror facing a second direction opposite to the first direction, a time difference between a first scan start time of a first light beam deflected by the first mirror and a second scan start time of a second light beam deflected by the second mirror being an odd multiple of half of an oscillation period of the scanner.

5. An image forming apparatus for forming an image by overlapping a plurality of monochromatic images respectively received from a plurality of photosensitive media, comprising:
a singular light scanning unit having a double-sided mirror scanner configured to rotationally oscillate, the scanner having at least one pair of oppositely facing mirrors each configured to deflect light, the light scanning unit being configured to scan a plurality of light beams deflected by the at least one pair of oppositely facing mirrors across surfaces of the plurality of photosensitive media along a main scanning direction,
wherein one or more distances, along a sub-scanning direction substantially perpendicular to the main scanning direction, between respective light beam spots formed on the plurality of photosensitive devices by the plurality of light beams are adjustable;

wherein the plurality of monochromatic images being overlapped on a transfer medium configured to move, wherein the at least one pair of oppositely facing mirrors includes a first mirror that faces a first direction and a second mirror facing a second direction opposite to the first direction, and wherein a first light beam spot formed on a first one of the plurality of photosensitive media by a first light beam reflected from the first mirror being spaced apart in the sub-scanning direction from a second light beam spot formed on a second one of the plurality of photosensitive media by a second light beam reflected from the second mirror by a distance by which the transfer medium moves during a time duration that is an odd multiple of one half of an oscillation period of the scanner.

6. The image forming apparatus of claim 3, wherein the light scanning unit is configured to scan four light beams.

7. The image forming apparatus of claim 6, wherein the plurality of monochromatic images formed on the plurality of photosensitive devices include yellow (Y), magenta (M), cyan (C) and black (K) images.

8. A method of correcting a color registration error in an image forming apparatus that forms a color image by overlapping a plurality of monochromatic images received from a plurality of photosensitive media, comprising:

scanning a plurality of light beams respectively across surfaces of the plurality of photosensitive media in one or more scanning lines that extend along a main scanning direction by rotationally oscillating a scanner having a first mirror that faces a first direction and a second mirror facing a second direction opposite to the first direction such that at least a first one of the plurality of light beams is deflected by the first mirror, and such that at least a second one of the plurality of light beams is deflected by the second mirror; and adjusting a distance, in a sub-scanning direction substantially parallel to the main scanning direction, between light beam spots formed on the plurality of photosensitive media by the plurality of light beams so as to correct a color registration error.

9. The method of claim 8, wherein the step of adjusting the distance in the sub-scanning direction between the light beam spots comprises:

providing a first light beam source and a second light beam source for each of the plurality of photosensitive media, respective optical paths of the first and second light beam sources being spaced apart from each other in the sub-scanning direction; and selecting one of the first and second light beam sources for scanning a corresponding one of the plurality of photosensitive media.

10. The method of claim 8, wherein the step of adjusting the distance in the sub-scanning direction between the light beam spots comprises:

repositioning at least one optical devices disposed along an optical path between at least one of the plurality of photosensitive media and a light source associated with the at least one plurality of photosensitive media so as to cause an optical path of a light beam received by the at least one of the plurality of photosensitive media to change in the sub-scanning direction.

11. The method of claim 8, wherein the step of adjusting the distance in the sub-scanning direction between the light beam spots comprises:

causing a first light beam spot formed on a first one of the plurality of photosensitive media to be spaced apart in the sub-scanning direction from a second light beam formed on a second one of the plurality of photosensitive media by an adjusted distance that is corresponds to a half of one cycle of scan lines in the sub-scanning direction.

12. The method of claim 8, further comprising:

timing respective start times for scanning of the plurality of light beams such that a first scan starting time of a first one of the plurality of light beams deflected off the first mirror being delayed from a second scan starting time of a second one of the plurality of light beams deflected off the second mirror by a time difference that corresponds to an odd multiple of one half of an oscillation cycle of the scanner.

13. The method of claim 8, wherein the plurality of monochromatic images include yellow (Y), magenta (M), cyan (C) and black (K) images.

* * * * *